United States Patent Office 3,141,787
Patented July 21, 1964

3,141,787
THIXOTROPIC AGENTS AND PREPARATION THEREOF
Wolfgang Goetze, Berlin-Reinickendorf, and Eugen Griebsch, Berlin-Britz, Germany, assignors to General Mills, Inc., a corporation of Delaware
No Drawing. Filed July 25, 1960, Ser. No. 44,860
Claims priority, application Germany July 29, 1959
18 Claims. (Cl. 106—252)

The invention refers to thixotropic agents and in particular to certain novel polyamides which when added to vehicles for coating compositions give them thixotropic properties and to the methods of preparation of these agents.

Methods for manufacturing of thixotropic vehicles or binders are already known. For instance according to U.S. Patent 2,663,649, alkyd resins with 3–10% of a polyamide made from dimeric fatty acids and polyamines, especially ethylene diamine, are heated to a temperature of 200–260° C. A binder with strong thixotropic properties is obtained in this manner. An important drawback of this method is that the whole quantity of alkyd resins or oil must be cooked together with the polyamide. During this cooking the application properties of the binder are influenced disadvantageously. In addition, the control of the reaction is difficult and unwelcome changes of color may take place.

Attempts have been made to eliminate these drawbacks by modifying the polyamides which are added to the alkyd resins, so that it would be possible to add them at room temperature or at only slightly elevated temperatures. However, up to this time, such attempts have not been entirely satisfactory, although it would be very desirable to have such substances which could impart to the already prepared alkyd resins the improved thixotropic properties without using a special and very expensive cooking equipment. Two such attempts are described below.

According to U.S. Patent 2,861,048, di- and trimeric fatty acids are heated with monomeric fatty acids and polyamines, preferably ethylene diamine, to obtain a waxlike product. Five to 15% of this product is dispersed in a solution of an alkyd resin in test-gasoline and it is heated to about 70° C. The thixotropic binder obtained in this manner shows only moderately strong thixotropy and a very low gel strength. In addition the solution is very turbid, which results in a diminished luster of the thereof produced varnish.

Somewhat similar results to the last example are reached when worked according to German application DAS 1,053,179. By heating polymeric fatty acid amides with alkyd resins, a waxlike or solid product is obtained, which is suitable to be used as additive to obtain thixotropic alkyd resins. Here too a relatively high turbidity is disturbing.

It has now been found that polyamides of polycarboxylic acids with and without the addition of monocarboxylic acids which are only partly amidated, but contain esterified carboxyl groups, dissolve in the binder or its solutions at room temperature or only slightly elevated temperature and give completely clear solution with high gel strength and pronounced thixotropic properties.

It is an object of this invention to provide novel thixotropic agents and methods of preparation thereof.

It is also a further object of this invention to provide polyamides of polycarboxylic acids containing esterified carboxyl groups.

It is also an object of this invention to provide novel thixotropic products.

These partly amidated esterified products can be manufactured in different ways.

When starting from polyamines, the latter are reacted with mixture of polycarboxylic acids and monocarboxylic acids and at the same time the free carboxyl groups are esterified. Suitable polycarboxylic acids are the polymeric fat acids, for example di- and/or trimerized fatty acids, further di- and tricarboxylic acids with long carbon chains, for example azelaic acid, sebacic acid, α-nonylsebacic acid and α-octylnonadicarboxylic acid. Suitable monocarboxylic acids are saturated and/or unsaturated fatty acids, for example linseed oil acids, soybean oil acids, cotton seed oil acids, castor oil acids, lauric acid, enanthic acid, pelargonic acid, etc. An especially suitable polyamine is ethylene diamine although higher polyamines such as diethylene triamine, triethylene tetramine, tetraethylene pentamine and other alkylene homologs may be employed.

It is preferable to carry out the reaction with polyamines in two steps. A polyamide is produced with an about equivalent quantity of polycarboxylic acids in a known manner; the resulting amide is then reacted with more poly- and/or monocarboxylic acids. In this manner free carboxyl groups are added under partial splitting of the polymer chains, these carboxylic groups then being esterified. In the reaction of the amide with additional acids, the esters of the acids may be used, thus generally eliminating the necessity for subsequent esterification.

Suitable polyamides are obtained by condensation at temperature between 180–300° C. from di- and/or trimerized fatty acids, or other dicarboxylic acids, such as azelaic acid, α-nonylsebacic acid, α-octylnonadicarboxylic acid with polyamines, especially with ethylene diamine.

Suitable acid components for conversion with above described polyamides are di- and/or trimerized fatty acids, further dicarboxylic acids, such as azelaic acid, sebacic acid, α-nonylsebacic acid, α-octylnonadicarboxylic acid, saturated and/or unsaturated fatty acids, for example linseed oil acids, soybean oil acids, cotton seed oil acids, castor oil acids, lauric acid, enanthic acid, pelargonic acid, etc. and the like.

Suitable alcohol components for esterifying are for example: methanol, ethanol, propanol and corresponding higher alcohols. Unsaturated and branched chain primary, secondary and tertiary alcohols may also be employed.

The temperature necessary for conversion of polyamide resins with the necessary quantity of acids mentioned above varies between 160–300° C., preferably between 180–230° C. The heating time varies from 15 minutes to several hours, depending on the reaction temperature. A short heating time produces resins which are only slightly soluble in alkyd resin solutions, while too long heating of the product gives only moderate thixotropic properties. The presence of oxygen causes an unwelcome coloring of the product. Therefore the reaction must be carried out under nitrogen or carbon dioxide.

The esterifying with the alcohols mentioned above may be carried out according to the known methods with conventional acid or alkaline esterification catalysts.

The proportion between the polyamide and acid can be varied widely. A proportion suitable for the desired properties of the product is used. It is preferable to use a quantity of acid which amounts to about five- to two-thirds by weight of the polyamide.

Instead of starting out with polyamide, it is also possible to come to the acid products in one step. Then we start out with the components, i.e., amines and acids. These components are condensed by heating and then esterified. Further it is possible to replace part of the acids with their esters. However it is important that the end product has a low acid value. The acid value should be under 10. For this reason the acid products obtained from either polyamide and acid or from amines and acids should be esterified.

The products obtained according to these methods can be dissolved at room temperature or at slightly elevated temperature in the solutions of alkyd resins or drying oils. Clear solutions with high gel strength and good thixotropic properties are obtained. The solutions can also be pigmented.

The proportion of the product according to this invention may amount to 5–20%, preferably 5–10%, calculated on the alkyd resin or drying oil.

*Example I*

100 g. of polyamide obtained from ethylene diamine and dimerized fatty acids by condensation at 210° C., with a ring softening point of 110° C. and amine number of 3 is mixed with 100 g. soy fatty acid and heated at 230° C. for 45 minutes. After the reaction is finished, it is cooled and to the reaction product are added 600 parts ethanol and 3 ml. concentrated hydrochloric acid. It is esterified for 1 hour by heating under a reflux condenser. Thereafter ethanol and hydrochloric acid are distilled away, first at normal pressure, later under vacuum. A waxlike product is obtained with an acid value of 8–10, which is very suitable for providing thixotropic properties. It is easily proved below.

40 g. of soy alkyd resin (50% oil contents) is dissolved in 60 g. test-gasoline by heating in a steam-bath. 4 g. of the obtained product are added to the still warm solution and quickly dissolved in it. A clear solution is obtained which after cooling stiffens to a thixotropic gel. The thixotropy can be determined with a Brookfield-viscosimeter.

*Example II*

50 g. of polyamide obtained from ethylene diamine and dimerized fatty acids by condensation at 230° C. with a ring softening point of 150° C. are heated to 230° C. together with 33 g. of dimerized fatty acid obtained from tall oil fatty acid and agitated at this temperature for 50 minutes in an atmosphere of carbon dioxide.

After cooling 15 g. of ethanol and 1 ml. of concentrated hydrochloric acid are added and esterified under a reflux condenser. Then alcohol and hydrochloric acid are distilled away. A product with an acid value of 7 is obtained, the thixotropic action of which is as follows.

Four parts of the obtained product are dissolved with agitation in 100 parts of siccativated 40% solution of a medium oil linseed oil alkyd in test-gasoline. To this are added 40 parts of Rutil and dispersed in the solution according to the usual method.

*Example III*

50 g. of polyamide with ring softening point of 170° C. obtained from dimerized fatty acids, sebacic acid and ethylene diamine are heated for 1 hour at 240° C. with 5 g. of dimerized fatty acid. The reaction is carried out in an atmosphere of nitrogen. Then it is esterified with ethanol as mentioned in the previous examples. A product with good thixotropic properties and an acid value of 9 is obtained.

*Example IV*

50 g. of polyamide obtained from dimerized fatty acids and ethylene diamine with a ring softening point 110° C. are heated with 50 g. soy fatty acids at 230° C. for 45 minutes 200 ml. of propylene alcohol and 1 ml. concentrated hydrochloric acid are added after cooling, whereafter it is heated under reflux for one and one-half hours. Then propylene alcohol and hydrochloric acid are distilled away under vacuum. A good thixotropic product with acid value 7 is obtained.

We therefore claim:

1. A process for preparing a modified easily soluble polyamide for use as a thixotropic additive which process comprises condensing an alkylene polyamine with an stoichiometric excess of an acid selected from the group consisting of polycarboxylic acids having more than 6 carbon atoms and mixtures thereof wtih monocarboxylic fatty acids having more than 6 carbon atoms, the alkyl esters thereof and subsequently esterifying the product with a monoalcohol until the acid value is less than 10.

2. A process as defined in claim 1 wherein said condensation is conducted by initially condensing said polyamine with an equivalent amount of said acid to provide a polyamide and subsequently reacting said polyamide with an additional ⅔ to 1⅔ by weight of said acids based on said polyamide.

3. A process as defined in claim 1 in which said polyamine is ethylene diamine and said polycarboxylic acid is selected from the group consisting of sebacic, azelaic and polymeric fat acids.

4. A process as defined in claim 2 in which said polyamine is ethylene diamine and said polycarboxylic acid is selected from the group consisting of sebacic, azelaic and polymeric fat acids.

5. A process as defined in claim 1 in which said esterification is conducted with an alkyl alcohol.

6. A process as defined in claim 2 in which said initial condensation is conducted at a temperature of from 180–300° C.

7. A process for preparing a modified easily soluble polyamide comprising condensing an alkylene polyamine with an equivalent amount of an acid compound selected from the group of polycarboxylic acids and mixtures thereof with monocarboxylic acids having more than 6 carbon atoms, the alkyl esters thereof, to provide a polyamide, subsequently heating said polyamide with an additional ⅔ to 1⅔ by weight of said acid compound based on said polyamide and subsequently esterifying the product with a mono-alcohol until the acid value is less than 10.

8. A process as defined in claim 7 in which said polyamine is ethylene diamine and said condensation is conducted with polymeric fat acids.

9. A process as defined in claim 7 in which said polyamine is ethylene diamine and said condensation is conducted with a mixture of polymeric fat acids and other polycarboxylic acids having more than 6 carbon atoms.

10. A process as defined in claim 8 in which said subsequent heating of said polyamide is conducted with a monocarboxylic fatty acid having from 6 to 22 carbon atoms.

11. A process as defined in claim 9 in which said subsequent heating of said polyamide is conducted with a monocarboxylic fatty acid having from 6 to 22 carbon atoms.

12. A process as defined in claim 7 in which said condensation is conducted at a temperature of from 180–300° C. and said subsequent heating is conducted at a temperature of 160–300° C.

13. A process as defined in claim 7 in which said condensation is conducted at a temperature of from 180–300° C. and said subsequent heating is conducted at a temperature of 180–230° C.

14. A thixotropic agent comprising a modified easily soluble polyamide which is the condensation product of an alkylene polyamine with an equivalent amount of an acid compound selected from the group consisting of polycarboxylic acids and mixtures thereof with monocarboxylic acids having more than 6 carbon atoms, the alkyl esters thereof, which is subsequently heated with an additional ⅔ to 1⅔ by weight of said acid compound and then esterified with a mono-alcohol until the acid value is less than 10.

15. A thixotropic product comprising a paint vehicle selected from the group consisting of alkyd resins, drying oils and resin acid esters having dispersed therein a modified easily soluble polyamide which is the condensation product of an alkylene polyamine with an equivalent amount of an acid compound selected from the group consisting of polycarboxylic acids and mixtures thereof with monocarboxylic acids having more than 6 carbon atoms, the alkyl esters thereof, which is subsequently heated with an additional ⅔ to 1⅔ by weight of said acid compound and then esterified with a mono-alcohol until the acid value is less than 10.

16. A thixotropic product as defined in claim 15 in which said polyamide is dispersed in said paint vehicle in an amount of from 5 to 20% by weight based on said paint vehicle.

17. A process for making a thixotropic product which comprises dispersing in a paint vehicle selected from the group consisting of alkyd resins, drying oils and resin acid esters an easily soluble polyamide which is the condensation product of an alkylene polyamine with an equivalent amount of an acid compound selected from the group consisting of polycarboxylic acids and mixtures thereof with monocarboxylic acids having more than 6 carbon atoms, the alkyl esters thereof, which is subsequently heated with an additional ⅔ to 1⅔ by weight of said acid compound and then esterified with a mono-alcohol until the acid value is less than 10.

18. A process as defined in claim 17 in which from 5 to 20% by weight of said polyamide based on said paint vehicle is dispersed in said paint vehicle.

References Cited in the file of this patent
UNITED STATES PATENTS

| | | |
|---|---|---|
| 2,474,202 | Rust | June 21, 1949 |
| 2,525,771 | Cook et al. | Oct. 17, 1950 |
| 2,663,649 | Winkler | Dec. 22, 1953 |